Aug. 6, 1929.  W. C. ESLECK  1,723,475
GLARE SHIELD AND ATTACHMENT FOR EYEGLASSES
Filed March 27, 1928
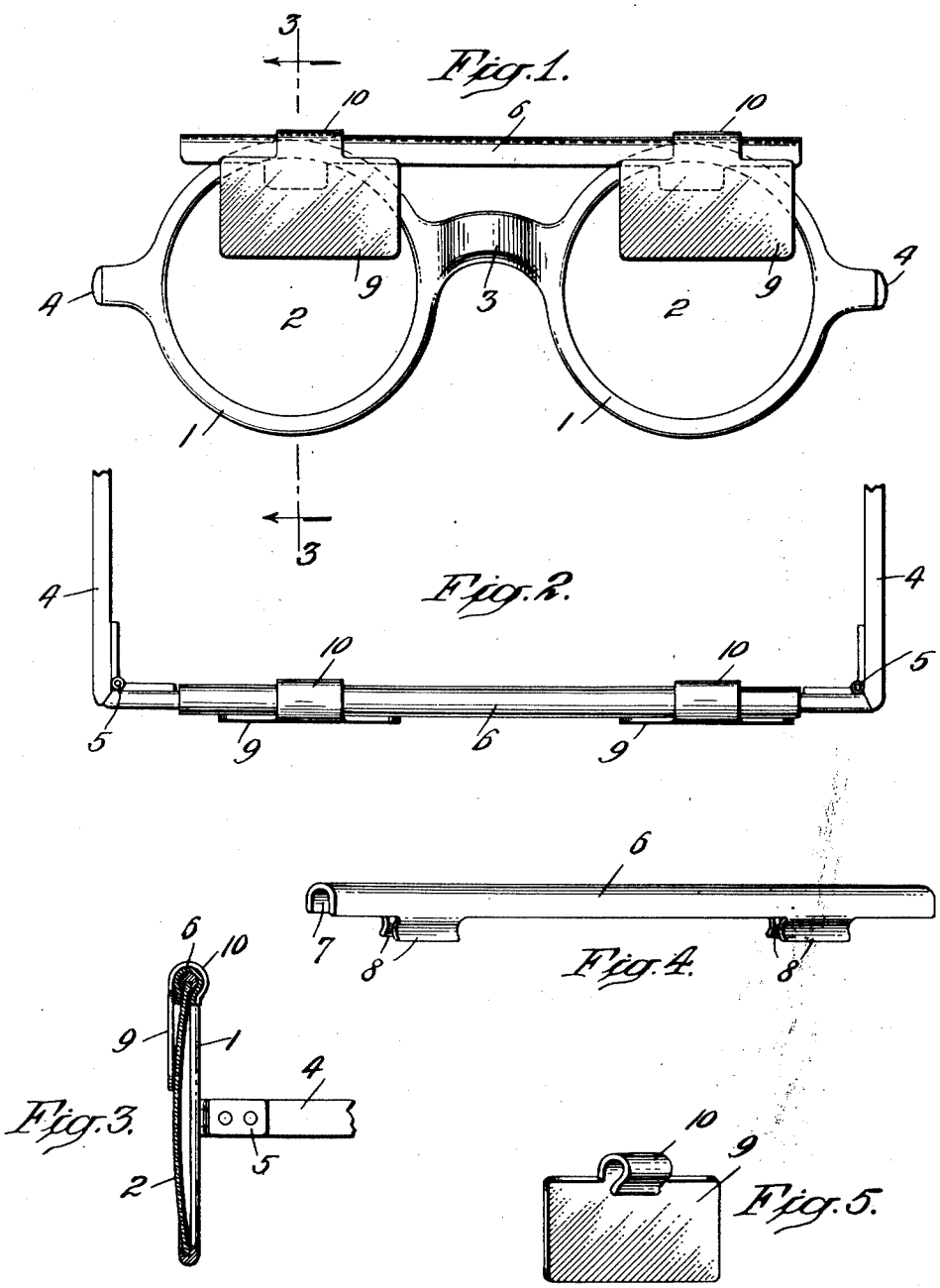

Patented Aug. 6, 1929.

1,723,475

UNITED STATES PATENT OFFICE.

WILLIAM C. ESLECK, OF SOUTHAMPTON, NEW YORK.

GLARE SHIELD AND ATTACHMENT FOR EYEGLASSES.

Application filed March 27, 1928. Serial No. 264,982.

The present invention relates to glare shields, or eye shades, designed for attachment to the frames of eye glasses and spectacles, especially those frames carrying a pair of lenses mounted in proper relation to the eyes, and said lenses having enclosing rims or not, said frames being therefore susceptible of a wider variation in form and function.

The improved means herein offered for intercepting a part or all of the glaring light emanating from automobile headlights and flooding driveway or road, are mounted adjustably on a horizontal support that is removably affixed to the lenses or lens frames of the eye-glasses and spectacles, and said shields are adjustable with relation to each other, the lenses and frames, either or both, and the eyes of the user, so as to secure the most effective results in practice.

Therefore I provide a simple and efficient attachment which any driver may apply to his glasses or spectacles when driving at night or at any other time or place where it is necessary to dim the glare for the sake of comfort or safety; and to this end, with these and other aims in view that will appear as I proceed, the invention may be said to consist essentially in the construction, combination and arrangement of parts, substantially as will be hereinafter described and claimed.

In the annexed drawing illustrating my invention:

Figure 1 is a front elevation of a pair of spectacles equipped with my improved antiglare attachment.

Figure 2 is a top plan edge view of the same.

Figure 3 is a cross-section on the line 3, 3, of Figure 1.

Figure 4 is a detail perspective view of the shield-supporting bar or rod.

Figure 5 is a detail perspective view of one of the glare shields.

Similar characters of reference denote like parts in all the figures of the drawing.

I have chosen the well known form of horn spectacles for illustration to show how my antiglare attachment may be combined therewith. This form of spectacles is so universally used both for far and near distances that it is conveniently referred to. Such a frame generally has rather large lenses 2, enclosed in substantially circular rims 1, connected by a nose 3, and having bows 4 to extend behind the ears, which bows are pivoted at 5 to the rims 1. These frames are made of various substances, as horn, celluloid, metal, and the like. For my present purpose, in cases where persons are non-users of spectacles but still require an antiglare device, this type of frame may still be used, with plain glass lenses, or without any lenses. And also it will be understood that the invention is quite adaptable to other kinds of frames, as well as to eye glasses; whatever be the shape of the glass, or its quality, size, etc., or the shape of the frame, provided only that there are points for the support of the shield-carrying horizontal bar member which forms a leading feature of my improved device.

6 denotes a horizontal bar, rod, or tube adapted to be supported horizontally on the rims 1, 1. Bar 6 may be made of any suitable material which is light and strong, as metal, or celluloid, hard rubber, or the like. It may have any shape, such as round, square, slotted, channeled, grooved, etc. In the special form shown, I have taken a length of celluloid which is rolled in tubular form to leave a longitudinal groove 7, and at two points the edges of groove 7 are provided with lips 8, 8, to provide clasps having a spring like action so that these clasps may be caused to engage the rims 1, 1, with a sufficient grip to locate the bar 6 rigidly on the upper part of the frame of the spectacles, or some other part of the spectacles or eye glasses or the like, it being noted that the various parts may vary widely in form, and the bar 6 as well as clasps 8 may vary widely and be made in many different ways with the object of rigidly but detachably mounting bar or rod 6 contiguous to the lenses or their rims, and enable the shields 9 to be properly positioned with reference to the eyes to shield against strong lights and glare.

Attached to the bar 6 is a pair of antiglare shields 9. They have reversely bent flanges 10 that furnish spring clasps that engage the upper edge of bar 6 and may be adjusted on said bar so as to be nearer together or farther apart, so that they will occupy the proper position with reference to the lenses 2 and the eyes of the user. Said shields 9 are flat pieces of any suitable material, as celluloid, colored glass, metal, hard rubber, etc., and may be opaque or translucent, to a greater or less degree, so as to moderate the intense illumination from strong, glaring headlights, and make the same bearable for the eyes. These shields are clasped on the bar 6, one in front of each lens 2 and therefore one in front of each eye.

The use and advantages of these shields will be manifest from the foregoing description. At night in driving, the shields will guard the eyes from the severe glare of the headlights of approaching cars. For this purpose the shields will be adjusted towards the left, as indicated, so as to cover the left part of the field of vision. In the daytime when the sunlight is very bright, they may be adjusted more evenly over the whole field of vision, so they will function similarly to a pair of smoked or colored glasses. For various uses therefore, and under various conditions these shields will be found of invaluable service; but more especially to counteract the effect of the piercing glare of headlights. Hence it will be found that many adjustments and changes in details may be necessary to suit different problems and the necessities of individual users.

From the foregoing it will be obvious that the entire field of vision is virtually unobstructed. The shields are used to cover only a small fraction or spot in such field, where the illumination is intense, and they leave all the rest of the roadway entirely visible, so that the sight of the road and of all objects is not interfered with, for the shields only block off these glare spots. The adjustability of the shields insures this, and the combination is such that the eyes can clearly glance out at the sides outside of the shields and all around the shields; in fact only a little of the road is cut off.

What I claim is:

1. In a device of the class described, the combination with an optical frame, of a horizontal bar having a pair of spring clips to engage said frame, and glare shields having reversely bent spring flanges engaging and slidable on the bar so as to adjust said shields in relation to the eyes.

2. Antiglare means for the eyes, consisting in the combination with the frame of a pair of spectacles, eye glasses or the like, of a grooved horizontal bar having spring clasping means whereby it may detachably engage said frame, and glare shields for the eyes consisting of slidable flat members having reversely bent spring clasps for attaching them adjustably to the bar in proper relation to the eyes.

3. The combination, in a device of the class described, with a spectacle or eye glass frame, or a grooved horizontal bar having spring clasps to engage said frame, and a pair of glare shields having integral reversely bent spring flanges to engage the bar and slidably adjustable on said bar in proper relation to each other and to the eyes.

4. In a device of the class described, the combination with an optical frame, of a bar adapted to surmount the frame and having a longitudinal groove having spring lips to engage the frame, and a pair of glare shields having reversely bent spring flanges engaging and carried adjustably and slidably on said bar.

5. The combination, in a device of the class described, with a spectacle, eye glass, or similar frame, of a horizontal bar having a straight upper edge and a lower grooved edge and adapted to engage said frame in said groove, and a pair of glare shields having integral bent spring flanges to engage the horizontal edge of said bar and slidably adjustable on said bar in proper relation to the eyes and to each other.

In testimony whereof I hereunto affix my signature.

WILLIAM C. ESLECK.